Figure 1:
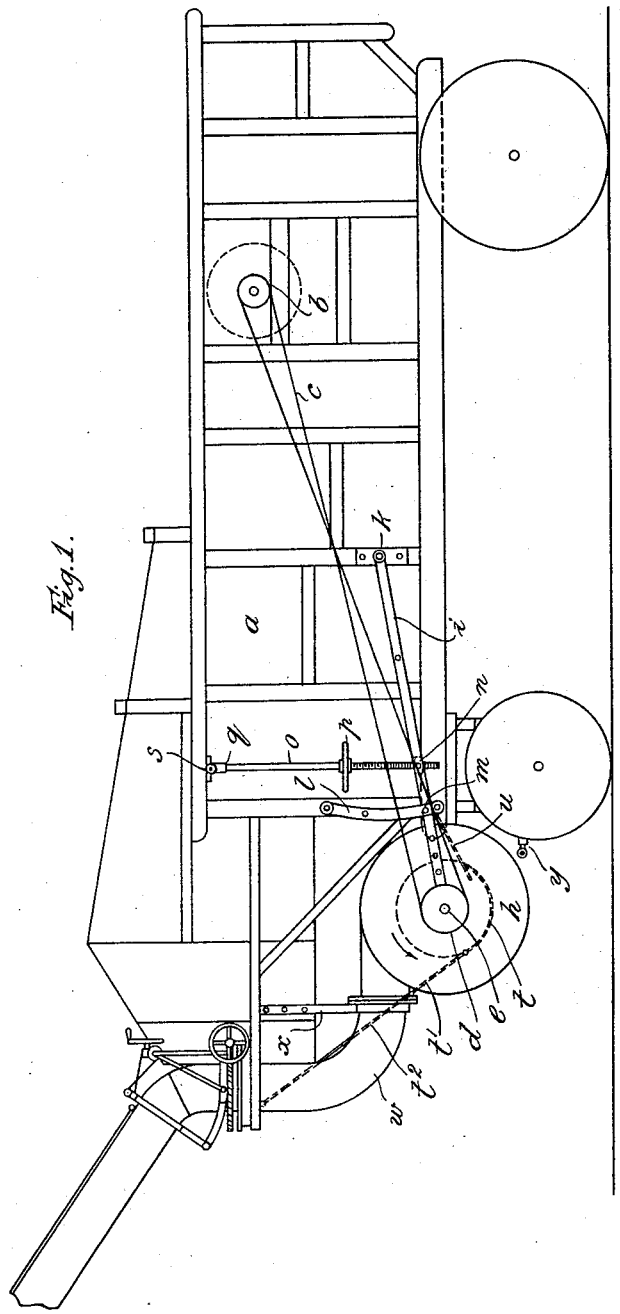

T. J. GEE.
WIND STACKER FOR THRESHING MACHINES.
APPLICATION FILED JULY 1, 1911.

1,031,706.

Patented July 9, 1912.
3 SHEETS—SHEET 1.

WITNESSES:

INVENTOR:
THOMAS JOHN GEE
By Attorney

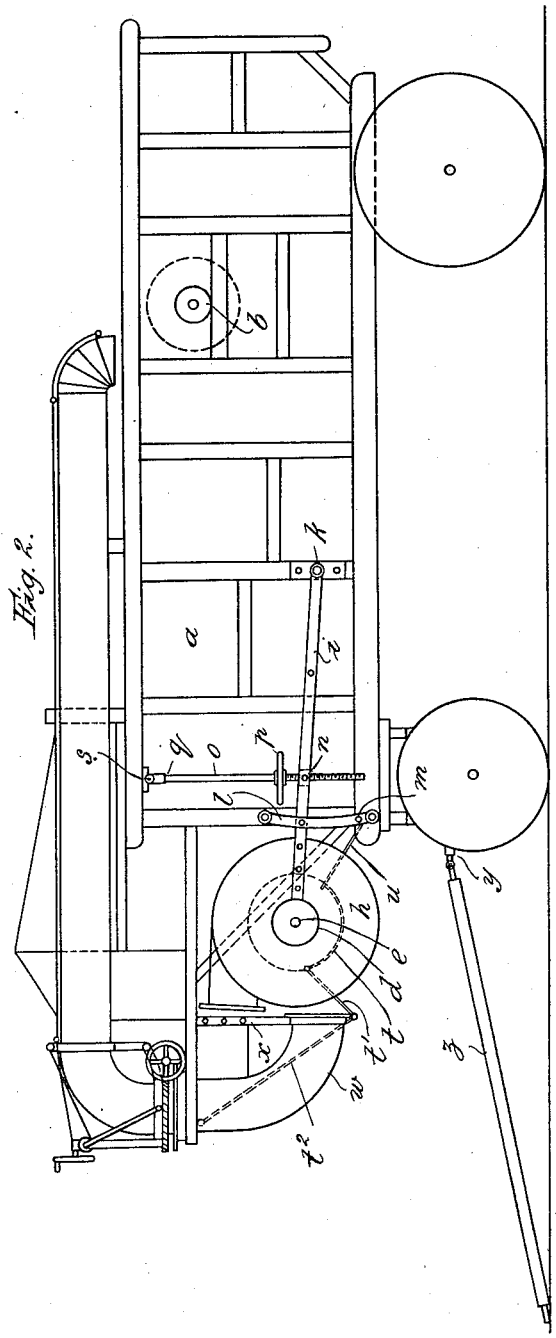

T. J. GEE.
WIND STACKER FOR THRESHING MACHINES.
APPLICATION FILED JULY 1, 1911.
1,031,706.
Patented July 9, 1912.
3 SHEETS—SHEET 3.
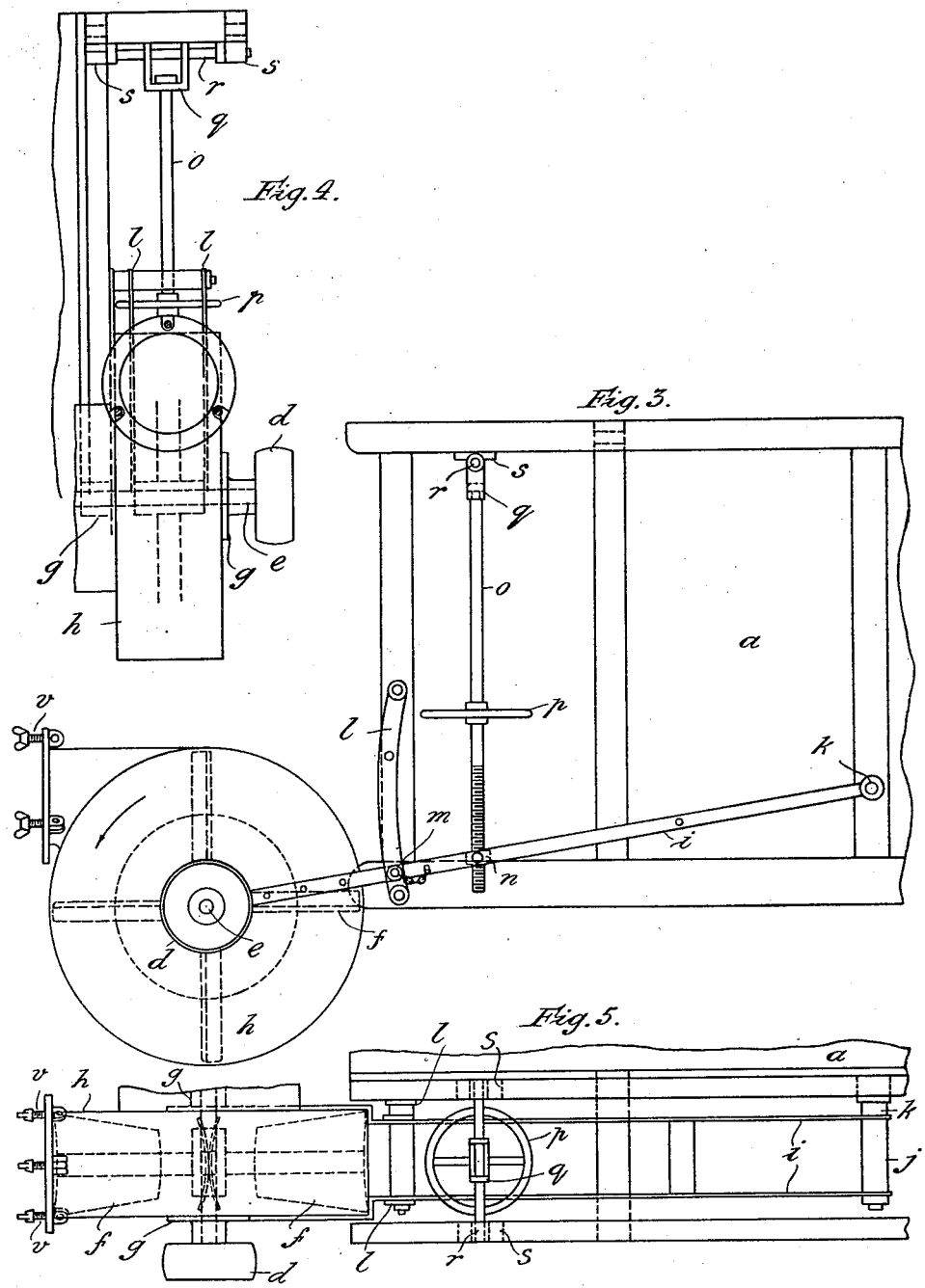

UNITED STATES PATENT OFFICE.

THOMAS JOHN GEE, OF BUENOS AIRES, ARGENTINA.

WIND-STACKER FOR THRESHING-MACHINES.

1,031,706.  Specification of Letters Patent.  Patented July 9, 1912.

Application filed July 1, 1911. Serial No. 636,505.

*To all whom it may concern:*

Be it known that I, THOMAS JOHN GEE, a subject of the King of the United Kingdom of Great Britain and Ireland, and residing at Buenos Aires, Argentina, have invented a certain new and useful Improvement in Wind-Stackers for Threshing-Machines, of which the following is a specification.

This invention relates to wind stackers such as are fitted to threshing machines, maize shellers and the like, and it has for its object to provide an improved construction which is especially adapted for application to threshing machines of the kind in which the front traveling wheels and the forecarriage are fitted at the shaker end of the machine.

The invention consists in the combination of elements hereinafter particularly described and pointed out in the claims.

In the accompanying drawings Figure 1 is a side elevation of a threshing machine embodying the invention, the wind stacker being shown in working position; Fig. 2 is a like view to Fig. 1 but showing the wind stacker in position when the machine is to be hauled. Fig. 3 is a side elevation; Fig. 4 is an end elevation, and Fig. 5 is a plan, showing details of the wind stacker.

Referring to the drawings, on the drum of the threshing machine $a$ is fitted a pulley $b$ which by means of a belt $c$ drives a pulley $d$ keyed to a spindle $e$ on which spindle are fitted curved fan blades or vanes $f$, said spindle $e$ being supported by bearings $g$ which latter are secured to the fan casing $h$. Arms $i$ are rigidly secured to the fan casing $h$, and between said arms are interposed distance pieces one of which is in the form of a bracket $j$ which is bored to suit a pivot bracket $k$ secured to the side of the threshing machine $a$. The said arms $i$ thus form a framework for the wind stacker fan, which framework is adapted to swing on the bracket $k$, and is guided and held in proper position by means of quadrants $l$ and a pin $m$ passing through orifices in the quadrants $l$ and the side arms $i$ of the swinging framework.

Suitably connected to the arms $i$ is a nut $n$ engaged by a screw-threaded spindle $o$ fitted with a hand wheel $p$; the spindle $o$ being suspended from the threshing machine by means of a forked bracket $q$, which bracket is carried by a short horizontal shaft $r$ and bearings $s$ secured to the machine so that on rotation of the hand wheel $p$ the spindle $o$ is also rotated within the nut $n$, whereby the wind stacker is raised from the position indicated in Figs. 1 and 3 to the position indicated in Fig. 2, the fan casing having been previously disconnected from the stacker, as hereinafter described. Plates $t$ $t^1$ and $t^2$, serving as members for conducting the straw to the fan, and also a plate $u$ serving as a member for conducting the chaff or cavings, are hinged so as to be free to move when the fan is raised or lowered. The provision of the said plates enables me to dispense with the use of auxiliary carriers for conveying the straw and cavings to the fan. The delivery flange on the fan casing is fitted with hinged bolts $v$ and wing nuts, in order that the operation of disconnecting this flange from the curved branch $w$ of the wind stacker may be effected without the necessity for using a spanner. The branch $w$ is secured to the threshing machine by means of a stay $x$, and eyebolts $y$ are fitted to the forecarriage of the machine in order to receive a drawbar or pole $z$ or like attachment for hauling the machine.

The above described arrangement of wind stacker is applicable to any type of threshing machine or maize sheller.

Having now described my invention what I claim and desire to secure by Letters Patent of the United States is:—

1. In a threshing machine, in combination, a framework pivotally connected to the body of the machine, means for raising and lowering the framework, means for retaining the framework in position, a fan casing mounted on the framework, and conducting members hingedly connected to a fixed part of the machine and to the fan casing, substantially as and for the purpose set forth.

2. In a threshing machine, in combination, a framework pivotally connected to the machine, a screw threaded spindle and nut for raising and lowering the framework, a quadrant and a pin for retaining the framework in position, a fan casing mounted on the framework and hinged plates movable with the fan casing.

In testimony whereof I have signed my name to this specification in the presence of two subscribing witnesses.

THOMAS JOHN GEE.

Witnesses:
WALLAU CRANSTON FAIRWEATHER,
JOHN McCLEARY.

Copies of this patent may be obtained for five cents each, by addressing the "Commissioner of Patents, Washington, D. C."